(12) United States Patent
Li et al.

(10) Patent No.: US 8,206,780 B2
(45) Date of Patent: *Jun. 26, 2012

(54) POLYMER COMPOSITE PHOTONIC PARTICLES

(75) Inventors: Yang Yang Li, Kowloon (HK); Vijay S. Kollengode, La Mirada, CA (US); Michael J. Sailor, La Jolla, CA (US); Shawn O. Meade, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 551 days.

This patent is subject to a terminal disclaimer.

(21) Appl. No.: 11/791,933

(22) PCT Filed: Dec. 14, 2005

(86) PCT No.: PCT/US2005/045047
§ 371 (c)(1),
(2), (4) Date: Dec. 3, 2007

(87) PCT Pub. No.: WO2006/065806
PCT Pub. Date: Jun. 22, 2006

(65) Prior Publication Data
US 2008/0145513 A1    Jun. 19, 2008

Related U.S. Application Data

(60) Provisional application No. 60/635,759, filed on Dec. 14, 2004.

(51) Int. Cl.
*B01J 13/02*   (2006.01)
*B05B 5/00*    (2006.01)
*A61K 9/50*    (2006.01)
*A61K 9/16*    (2006.01)

(52) U.S. Cl. .............. 427/162; 427/213.36; 424/489; 424/490; 977/700; 977/895; 428/402

(58) Field of Classification Search .............. 427/2.23, 427/162, 213.36; 424/490, 489; 977/700, 977/895; 428/402
See application file for complete search history.

(56) References Cited

U.S. PATENT DOCUMENTS

| | | | |
|---|---|---|---|
| 5,318,676 A | 6/1994 | Sailor et al. | |
| 6,105,878 A | 8/2000 | Robinson et al. | |
| 6,291,597 B1 * | 9/2001 | Gruber et al. | ........... 525/450 |
| 6,806,543 B2 | 10/2004 | Yamakawa et al. | |
| 6,970,239 B2 | 11/2005 | Chan et al. | |
| 7,001,669 B2 | 2/2006 | Lu et al. | |
| 7,042,570 B2 | 5/2006 | Sailor et al. | |
| 7,094,464 B2 | 8/2006 | Mao et al. | |
| 2001/0044119 A1 | 11/2001 | Ghadiri et al. | |
| 2002/0072116 A1 | 6/2002 | Bhatia et al. | |
| 2002/0132101 A1 | 9/2002 | Fonash et al. | |
| 2002/0167118 A1 | 11/2002 | Billiet et al. | |
| 2003/0089899 A1 | 5/2003 | Lieber et al. | |
| 2003/0171257 A1 * | 9/2003 | Stirbl et al. | ........... 514/2 |
| 2003/0231304 A1 | 12/2003 | Chan et al. | |
| 2004/0053422 A1 | 3/2004 | Chan et al. | |
| 2005/0042764 A1 | 2/2005 | Sailor et al. | |
| 2005/0058416 A1 | 3/2005 | Hoon Lee et al. | |
| 2005/0266045 A1 | 12/2005 | Canham et al. | |
| 2006/0096922 A1 | 5/2006 | Gin et al. | |
| 2006/0105043 A1 | 5/2006 | Sailor | |

FOREIGN PATENT DOCUMENTS
WO    WO 2004/071949    *    8/2004

OTHER PUBLICATIONS

Bley, R.A., et. al., "Characterization of Silicon Nanoparticles Prepared from Porous Silicon", *Chem. Mater.*, 1996, 8, 1881.
Canham, L.T., et. al, "Bioactive Silicon Structure Fabrication Through Nanoetching Techniques", *Adv. Matter*, 1995, 7, 1033.
Canham, L.T., "Storage of porous silicon", *Properties of Porous Silicon*, vol. 18, (e. L. Canahm) pp. 44-50, (Short Run Press Ltd., London) 1997.
Canham, L.T., et. al. "Derivatized Porous Silicon Mirrors: Implantable Optical Components with Slow Resorbability", *Phys. Stat. Sol.* A 2000, 182,521.
Chan, S., et. al., "Porous Silicon Microcavities for Biosensing Applications", *phys. stat. sol. (a)*, 182, 541, (2000).
Chan, Selena, et. al., "Identification of Gram Negative Bacteria Using Nanoscale Microcavities", *J. Am. Chem. Soc.*, (2001), 123, pp. 11797-11798.
Cunin, Frederique, et al., "Biomolecular screening with encoded porous silicon photonic crystals", www.nature.com/naturematerials, vol. 1, Sep. 2002, pp. 39-41.
Cazzanelli, M., et. al., "Temperature dependence of the photoluminescence of all-porous-silicon optical microcavities", *Journal of Applied Physics*, vol. 85, No. 3, Feb. 1, 1999.
Coffer, J.L., "Porous Silicon Formation by Stain Etching", *Properties of Porous Silicon*, vol. 18, (e. L. Canahm) pp. 23-29, (Short Run Press Ltd., London), 1997.
Dancil, Keiki-Pua S., et. al., "A Porous Silicon Optical Biosensor: Detection of Reversible Binding of IgG to a Protein A-Modified Surface", *J. Am. Chem. Soc.* 1999, 121, 7925.

(Continued)

*Primary Examiner* — James J Seidleck
*Assistant Examiner* — Saira B Haider
(74) *Attorney, Agent, or Firm* — Greer, Burns & Crain Ltd.

(57) ABSTRACT

A method for forming photonic particles, where the method includes the steps of preparing a porous photonic material layer, patterning a soluble polymer on the porous photonic material layer, leaving dividing portions of the material layer untreated, infusing the polymer into the material layer, and removing the dividing portions of the material to obtain the photonic particles.

18 Claims, 3 Drawing Sheets

OTHER PUBLICATIONS

Gao, Jun, et. al., "Porous-silicon vapor sensor based on laser interferometry", *Applied Physics Letters*, vol. 77, No. 6, Aug. 7, 2000.

Gao, Jun, et. al. "Vapor Sensors Based on Optical Interferometry from Oxidized Macroporous Silicon Films", *Langmuir*, 2002, 18, pp. 2229-2233.

Foraker, Amy B., et. al., "Microfabricated Porous Silicon Particles Enhance Paracellular Delivery of Insulin across Intestinal Caco-2 Cell Monolayers", *Pharm. Res.* 2003, 20,110.

Halimaoui, A., "Porous Silicon Formation by Anodisation", *Properties of Porous Silicon*, vol. 18, (e. L. Canahm) pp. 12-22, (Short Run Press Ltd., London), 1997.

Heinrich, J.L., et. al., "Luminescent Colloidal Silicon Suspensions from Porous Silicon", *Science*, 1992, 255, 66.

Lehmann, Volker, et. al., "Optical shortpass filters based on macroporous silicon", *Applied Physics Letters*, vol. 78, No. 5, Jan. 29, 2001.

Letant, S.E., et. al, "Integration of porous silicon chips in an electronic artificial nose", *Sensors and Actuators B*, 69 (2000) pp. 193-198.

Lin, Victor S.-Y, et. al., "A Porous Silicon-Based Optical Interferometric Biosensor", *Science* 1997, 278, 840.

Link, Jamie R., et. al., "Smart dust: Self-assembling, self-orienting photonic crystals of porous Si", , *Proc. Nat. Acad. Sci*, 2003, 100, 10607.

Loni, A., "Capping of Porous Silicon", *Properties of Porous Silicon*, vol. 18, (e. L. Canahm) pp. 51-58, (Short Run Press Ltd., London), 1997.

Mazzoleni, C., et. al., "Application to optical components of dielectric porous silicon mutlilayers", *Appl. Phys. Lett.*, 67 (20) Nov. 13, 1995.

Meade, Shawn O., et. al. "Porous Silicon Photonic Crystals as Encoded Microcarriers", *Adv. Mater.* Oct. 18, 2004, 16, No. 20.

Navarro, M., et. al., "Improvement of the porous silicon sacrifical layer etching for micromachining applications", *Sens. Actuators A* 1997, 62, 676.

Navarro, M., et. al., Electrochemical etching of porous silicon sacrifical layers for micromachining applications, *Micromechanics Microeng.* 1997, 7, 131.

Okuyama, K., et. al., "Preparation of nanoparticles via spray route", *Chem. Eng. Sci.* 2003, 58, 537.

Pavesi, L., et. al., "Random porous silicon multilayers: application to distributed Bragg reflectors and interferential Fabry-Perot filters", *Semicond. Sci. Technol.*, 12 (1997) pp. 570-575.

Pellegrini, Vittorio, et. al., "Enhanced optical properties in porous silicon microcavities", *Physical Review B*, vol. 52, No. 20, Nov. 15, 1995.

Schmedake, Thomas, et. al, "Standoff Detection of Chemicals Using Porous Silicon "Smart Dust" Particles", *Adv. Mater.* 2002, 14, 1270.

Sirbuly, D.J., et. al., "Patterned Microstructures of Porous Silicon by Dry-Removal Soft Lithography", *Adv. Mater.* 2003, 15, 149.

Snow, P.A., et. al., "Vapor sensing using the optical properties of porous silicon Bragg mirrors", *Journal of Applied Physics*, Vo. 86, No. 4, Aug. 15, 1999.

Stewart, Michael P., "Photopatterned Hydrosilylation on Porous Silicon", *Angew. Chem. Int. Ed. Engl.* 1998, 37,3257.

Thonissen, M., et. al., "Multilayer structures of porous silicon", *Properties of Porous Silicon*, vol. 18, (e. L. Canahm) pp. 30-37, (Short Run Press Ltd., London) May 1997.

Vincent, G., "Optical properties of porous silicon superlattices", *Appl. Phys. Lett*, 64 (18), May 2, 1994.

Zangooie, S., et. al., "Vapor sensitivity of thin porous silicon layers", *Sensor and Actuators B*, 43 (1997) pp. 168-174.

Zangooie, Shahin, et. al., "Infrared ellipsometry characterization of porous silicon Bragg reflectors", *Applied Optics*, vol. 40, No. 6 Feb. 20, 2001.

Allcock, P., et. al., "Time-resolved sensing of organic vapors in low modulation porous silicon dielectric mirrors", *Journal of Applied Physics*, vol. 90, No. 10, Nov. 15, 2001.

Allongue, P., "Porous silicon formation mechanisms", Aug. 1997.

Bellet, D., "Drying of Porous Silicon", *Properties of Porous Silicon*, vol. 18, (e. L. Canahm) pp. 38-43, (Short Run Press Ltd., London) 1997.

Berger, M.G., et. al., "Dielectric filters made of PS: advanced performance by oxidation and new layer structures", *Thin Solid Films*, 297 (1997) pp. 237-240.

\* cited by examiner

POLYMER COMPOSITE PHOTONIC PARTICLES

PRIORITY CLAIM

Applicants claim priority benefits under 35 U.S.C. §119 on the basis of Patent Application No. 60/635,759, Dec. 14, 2004.

STATEMENT OF GOVERNMENT INTEREST

This invention was made with Government assistance under Grant F49620-02-1-0288 awarded by AFOSR. The Government has certain rights in this invention.

TECHNICAL FIELD

A field of the invention is optics. Another field of the invention is photonic structures.

BACKGROUND ART

Photonic crystals constructed from porous Si and other materials may be achieved by a computer-controlled electrochemical etch process. Films of porous Si photonic crystals and other materials may be converted into coded small particles (so-called "smart dust"), and the "smart dust" particles may in turn provide for a host of applications, such as chemical and biological sensing, high-throughput screening, controlled-release drug delivery, and many other uses. In vivo applications are possible with benign materials such as silicon, and other materials including semiconductors and insulators may be used for encoding. In addition to the coded "smart dust," other types of photonic crystals have applications in sensing, detection and other uses.

DISCLOSURE OF INVENTION

A method to construct photonic particles consisting of a porous Si one-dimensional photonic crystal infused with a polymer is described. A preferred embodiment method includes steps of preparing a porous photonic material layer, patterning a soluble polymer on the porous photonic material layer, leaving dividing portions of the material layer untreated, infusing the polymer into the material layer, and removing the dividing portions of the material to obtain the photonic particles. The patterning in preferred embodiments is accomplished by depositing a fine mist of polymer solution onto a photonic crystal layer and then removing the uncoated material by chemical dissolution.

BEST MODE FOR CARRYING OUT THE INVENTION

Complex coding of porous materials with computer controlled etching conditions has been demonstrated, and division of a porous film including one or more codes in the porous structure (or more generally any photonic crystal) into particles may be accomplished by numerous methods, such as, for example, ultrasonic fragmentation, photolithography, or soft lithography. However, these methods of division are not without problems.

Ultrasonication of the porous film produces fragments with sharp edges and poorly controlled sizes, an undesirable feature for in vivo applications. While photolithography offers greater control over fragment shape, it is also more expensive and time-consuming. Dry-removal soft lithography, in which an elastic stamp is pressed into a heated porous Si film, offers a rapid method to produce micron-sized porous Si features with well-controlled shapes. However, dry-removal soft lithography requires a pre-patterned master, and while it is possible to obtain particles having rounded edges using this process, it is difficult to obtain such rounded particles, nor is the process reliable for obtaining same. Additionally, the particles resulting from dry-removal soft lithography are typically open-pore structures that suffer from chemical and optical instability The present invention provides a method for forming coded particles, as well as a method for dividing a coded porous film into small particles. A preferred method of the invention is similar in nature to soft lithography, but advantageously does not require a pre-patterned master. In embodiments of the invention, spray deposition is used to deposit small polymer drops onto a porous film having a coded porous structure, such as a porous Si film, a porous $SiO_2$ film, or a porous alumina film, but which is also applicable more generally to photonic films.

The polymer drops deposited on the porous film act as etch masks and also serve to stabilize the resulting microscopic porous photonic crystals. This microdroplet patterning method represents a simple and inexpensive technique to produce large quantities of uniform and stable photonic crystal particles. Well established techniques known to those skilled in the art, such as ink-jet printing or nozzle spraying, provide an exemplary basis that may be used to control the size of micron-sized and smaller particles. In addition, commercially available polymer beads may be melted into the pores to obtain particles having highly uniform sizes (on the order of 10 microns).

It should be noted that the preferred embodiments will be discussed along with some exemplary experimental results, and the experimental results should not be construed as limiting the scope of the preferred embodiments.

Figure 1:
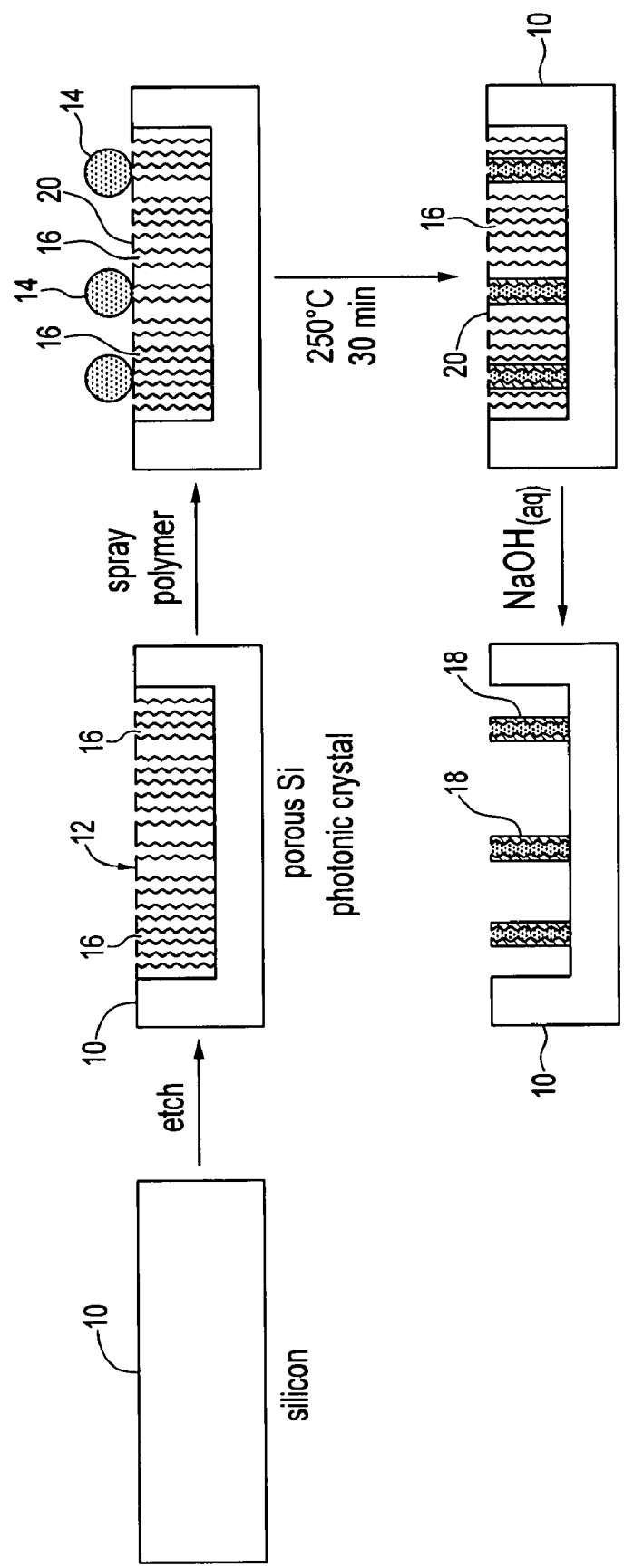
FIG. 1 is a schematic diagram illustrating preparation of polymer/porous Si photonic crystal nanocomposites according to one embodiment of the invention.

FIG. 1 illustrates the first preferred method, where rugate filter particles having a predetermined size and configuration are formed using a silicon template and spray deposition. A film, preferably a silicon film 10, is provided, and subsequently etched to obtain a desired porous silicon template, generally at 12. The porous silicon template 12 includes a desired nanostructure, upon which template a desired polymer solution 14 is impinged and infuses pores 16 of the porous silicon template. The solution 14 is fixed within the pores 16, and portions of the template 12 not having polymer solution disposed thereon or therein are subsequently removed, resulting in particles 18 having the desired size, configuration and composition.

While the invention anticipates use of a wide array of molecules and pharmaceutical candidates, for purposes of illustration only, some particular candidates include polyesters, poly (lactic acid), PLGA, collagen, polypeptides such as zein (a natural polymer derived from maize), and hydrogels.

Exemplary experimental values will be discussed in connection with FIG. 1, to illustrate one preferred embodiment more particularly. The porous silicon template 10 is preferably a rugate filter, which exhibits a sinusoidal variation in porosity with depth, and is prepared in porous Si. The resulting structure is a 1-dimensional photonic crystal that displays a sharp resonance in the reflectivity spectrum. The solution 14 is a fine mist of polystyrene solution in toluene, (for exemplary purposes only, such as 16% by mass solution), which is then impinged on the surface by spray-coating using a commercial artist's air brush. Many other patterning techniques are also possible. Inkjet printing and other droplet patterning and spray techniques may be used, for example. Areas not having polymer deposited thereon may be considered "dividing portions" 20, as the dividing portions will be removed and the portions with polymer deposits will eventually form the particles 18.

While it is contemplated that the temperature and pH at which infusion is carried out may differ to suit individual applications, in one exemplary experiment, the sample is heated in an oven at 250° C. for 30 min to infuse the polymer into the porous matrix. The uncoated porous Si is then removed, such as by treatment with an aqueous base. In the exemplary embodiment, the aqueous base is provided as a pH 10 buffer. Treatment with aqueous base is a common means to remove sacrificial porous Si layers surrounding structures that have been chemically modified or masked using conventional lithography. The resulting particles are polymer composite materials having superior physical characteristics, such as having smooth features and being both mechanically and optically stable. The polymer does not interfere with the optical properties of the silicon template, and embodiments of the invention include, for example composite polymer Rugate filters and composite polymer smart dust particles.

Figure 2:
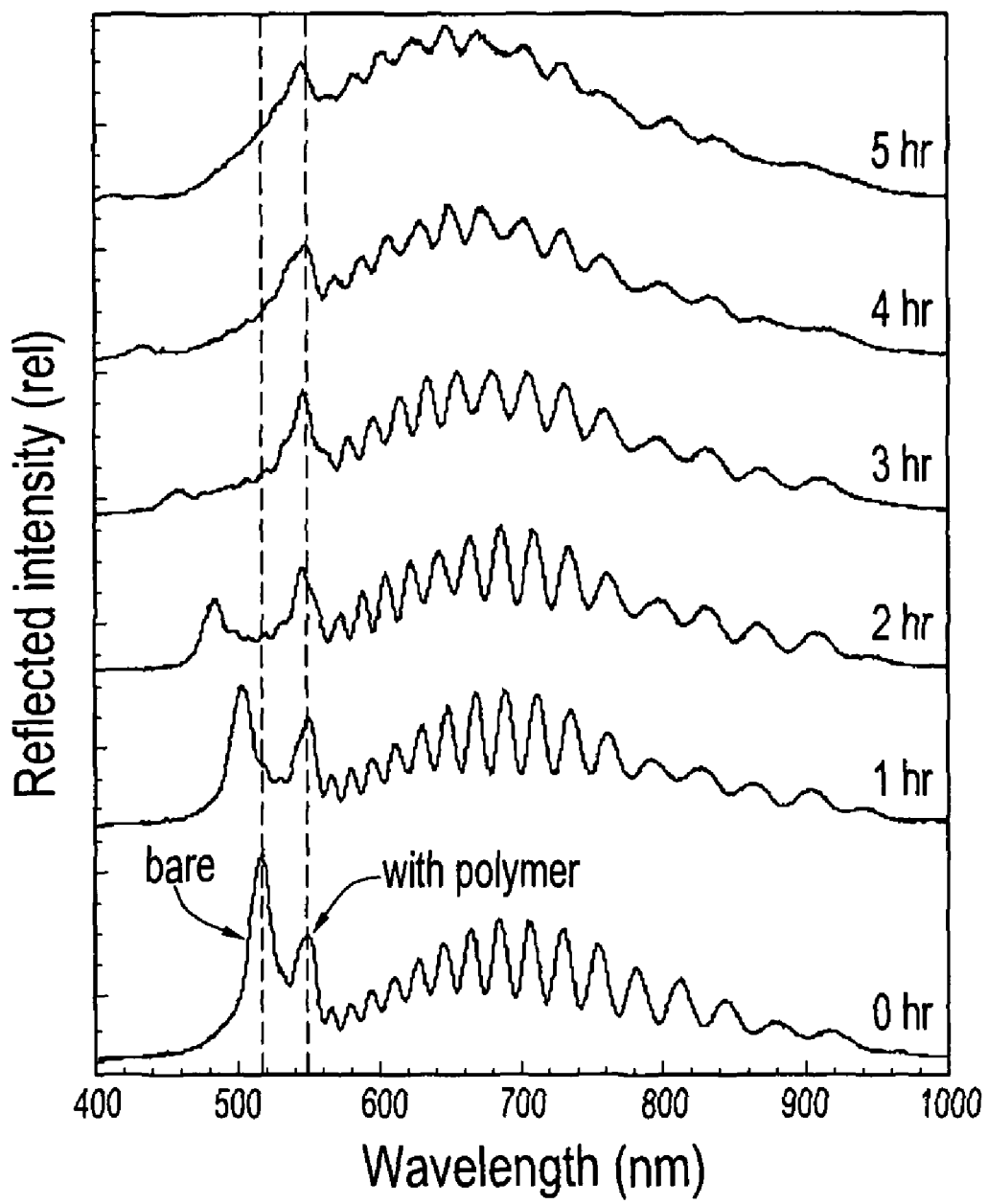
FIG. 2 is a graph illustrating normal-incidence white light reflection spectra obtained in situ from a porous Si photonic crystal containing polystyrene domains.

To illustrate the efficiency of one exemplary method for dissolving the dividing portions, reflectivity spectra obtained from the microdroplet-patterned porous Si film upon immersion in a buffer solution, such as a pH 10 buffer solution, provide a convenient means to monitor dissolution of the unmasked regions. For example, spectra obtained from an area on the film of 1 mm in diameter initially display two main peaks (FIG. 2). The polymer domains are much smaller than the 1 mm spot size of the spectrometer, and the two peaks correspond to a superposition of the solution-filled (FIG. 2, "bare") and the polymer-filled (FIG. 2; "with polymer") porous Si photonic crystal. The highest energy peak at 520 nm in FIG. 2 is associated with regions that contain the base solution, and the peak at 550 nm corresponds to the polymer-infused domains. The spectrum from the polymer-infused photonic crystal is red-shifted due to the larger refractive index of polystyrene relative to the aqueous base solution.

Thus, as illustrated in the exemplary results of FIG. 2, as the uncoated dividing regions of the porous Si layer dissolve in the aqueous base solution, the resonance from the photonic crystal (initially at 520 nm) blue shifts and decreases in intensity. After several hours, the unprotected porous Si layer has completely dissolved and only the resonance associated with the polymer-infused material (at 550 nm) remains. Base treatment does not significantly shift or diminish this peak, indicating that polystyrene is effective at protecting porous Si from corrosion by aqueous base. A broad background signal, corresponding to reflection of the illumination source from the bare silicon substrate, grows in as the unprotected porous Si layer is removed. This white light background reduces the fidelity of the signal coming from the polymer-infused photonic crystal domains remaining on the substrate. Side bands of the fundamental resonance from the photonic crystal are also apparent in the spectra at longer wavelengths. After treatment with base, the composite particles can be removed from the substrate by mechanical scraping or by ultrasonication.

Microdroplet patterning provides disc-shaped particles without sharp edges, as revealed by scanning electron microscopy. A porous filter or screen placed between the sprayer and the sample provides additional control over the shape and size distribution of the nanocomposite particles. Micron-sized photonic crystals are generated when a Poretics polycarbonate membrane filter containing 20 μm-diameter pores is placed between the spray nozzle and the porous Si film, 2 mm from the wafer. Regularly spaced photonic crystal squares measuring from 50 to 200 μm on an edge result if a copper transmission electron microscopy grid of the appropriate dimensions is placed on the surface of the film prior to spraying. The structures retain their photonic features after base treatment, and appear uniform under an optical microscope.

The microdroplet patterning provides a general means to fabricate composite photonic crystal particles from a porous Si multilayer and a polymer or other soluble material. The nanocomposites possess stable spectral features and increased resistance towards corrosion.

In another preferred embodiment, small polymer beads, such as polystyrene beads, were melted into the pores of a porous template. Polystyrene beads, for example, are commercially available and include very tight size distributions, which when used with methods of the invention, result in disk-shaped particles having highly uniform sizes (on the order of 10 microns). This method is especially advantageous in the fields of biological and chemical screening and drug delivery, to name a few. In biological and chemical screening applications, optically encoded porous silicon substrates can be used as the substrate of predetermined porosity, thus transferring the optical code from the electrochemically programmed porous silicon to the polymer microbead replicate.

More particularly, commercially available polymeric microbead precursors, which preferably exhibit monodisperse size distributions, are obtained. Monodisparity of the polymeric microbead precursors is preferred insofar as it provides for batches of replicate microbeads having a similar monodisparity to the precursors. Monodisparity of the polymeric microbead precursors is especially preferred in applications such as biological screening because it ensures that each microbead replicate includes a similar number of chemical probes, which in turn contributes to more precise assay results.

Figure 3:
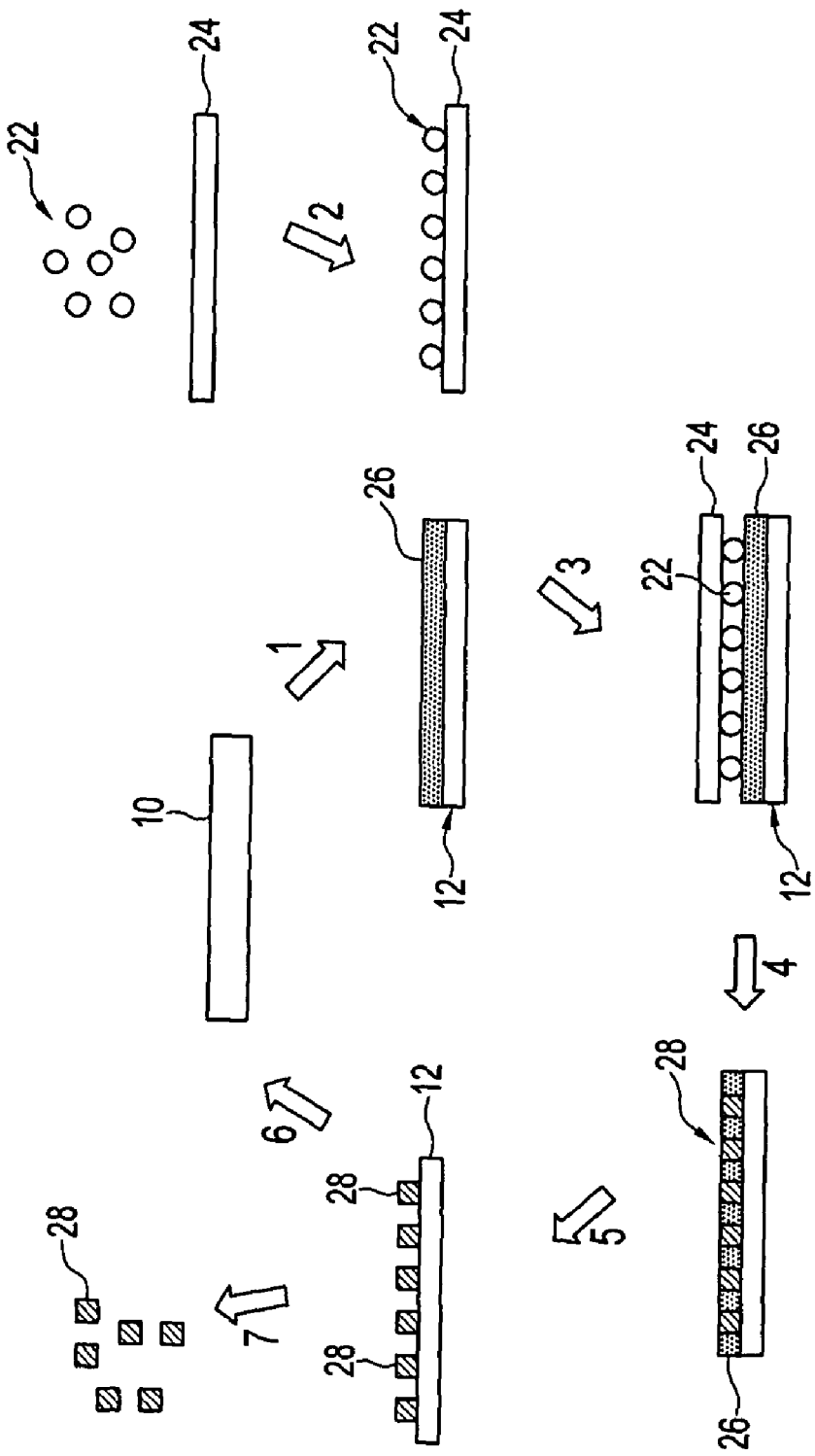
FIG. 3 is a schematic diagram illustrating preparation of polymer/porous Si photonic crystal nanocomposites according to another embodiment of the invention.

FIG. 3 illustrates an exemplary method using the polymeric microbeads. Prior to performing the patterning process, the stock suspension of precursor polymeric microbeads should be washed in ethanol. First, the porous silicon film 10 is etched to obtain the porous silicon template 12. Next, the precursor polymeric microbeads, generally at 22, are dispersed onto either a surface of a soft polymer pad 24 (shown) or directly onto the porous silicon template 12. The precursor polymeric microbeads 22 disposed on the soft polymer pad 24 are then exposed to the surface of the porous template 12, such as by pressing and brushing the precursor polymeric microbeads and soft polymer pad 24 onto the template. Brushing is completed when most of the precursor polymeric microbeads 22 are not in contact with neighboring precursor polymeric microbeads.

Next, the precursor polymeric microbeads 22 are softened by heating and allowed to infiltrate into the porous matrix 26 of the silicon template 12 to obtain microbead infiltrated template, generally at 28. A solvent vapor, or a solvent vapor in combination with temperature, may also be used to achieve softening and infiltration of the template 12. Where temperature alone is used, a relatively low temperature, such as 100° C., is preferred, although the invention contemplates use of any temperature sufficient to promote infusion. Finally, the porous matrix 26 is stripped away and the polymer microbead replicates 28 are lifted from the surface of the template 12. Where the template is porous silicon, the porous silicon matrix 26 may be stripped away by a solution of potassium hydroxide. Diluting the base solution with ethanol allows for better wetting during the stripping process. Once the polymer microbead replicates 28 are lifted off the surface of the template 12, the replicates can be collected via suction filtration.

Electron microscopy reveals each phase of photonic particle formation, where precursor polymeric microbeads 22 first rest on a surface of the porous template 12 after having been transferred from the pad 24. Low heat, approximately 100° C. was used to partially soften the precursor polymeric microbeads 22 so that the precursor polymeric microbeads would stick to the template 12 rather than to the pad 24 during transfer. The polymer replicates 28 are then lifted off of the surface of the template 12.

Still other embodiments include a method for forming small particles that can circulate in the bloodstream (so-called "erythrocyte mimics" because they resemble red blood cells). These particles may contain targeting moieties (such as polypeptides or antibodies) to allow the particles to selectively stick to cancer cells or other diseased tissue in the body. The particle would contain a payload such as a drug, image contrast agent (for MRI, PET, ultrasound imaging), magnetic nanoparticles, or other payload that can be released locally to the diseased tissue. The target moieties may be added by chemical modification after the particles are formed, whereas the payload is preferably disposed inside of the particles.

More particularly, targeting moieties may include a variety of structures, including but not limited to, peptides, DNA and/or RNA strands, sugar molecules, lectins, and antibodies. The payload, which is preferably disposed inside of the particles, may also be selected from a vast array of substances, including but not limited to, an anti-cancer agent such as doxorubicin, an anti-inflammatory agent such as dexamethasone, a steroid, an RNA aptamer, a Fab fragment (antigen binding domain of an immunoglobulin antibody), an immunosuppressor such as rapamycin, to name a few.

Advantageously, the polymer-filled photonic crystals are much more stable than the parent porous Si films, allowing use of the polymer-filled photonic crystals in high-throughput or multiplexed bioassays. In such applications, the polymer composites act as encoded particles, to which the appropriate bioassay chemistries can be attached.

Methods of the invention are applicable to a variety of industries, including but not limited to drug discovery, biological screening, chemical screening, biological labeling, chemical labeling, in vivo labeling, security identification and product marking. Various attributes of the particles and methods of the invention enable a wide range of applications in various industries. The small size of the particles facilitates ready incorporation into various hosts, e.g., products, test kits, assays, powders (such as explosives for identification), pastes, liquids, glass, paper, and any other host or system that can accept small particles. In vivo detection is enabled by biocompatible particles of the invention, which may then be queried, for example, through tissues using near infrared and infrared wavelengths that penetrate tissues.

It is anticipated that embodiments of the invention may be used for a broad range of applications, such as controlled drug release and/or controlled drug delivery. Accordingly, a particular drug or drugs may be loaded into the particles via one of a plurality of methods.

First, the polymer impinged upon the surface of the porous film may already contain the drug or drugs dissolved in solution, such that when the polymer infuses the pores, the drug or drugs also infuses the pores of the film. Secondly, the drug or drugs may be pre-adsorbed to the porous Si or $SiO_2$ film before spraying or melting the polymer therein. Third, upon subsequent removal of the porous Si or $SiO_2$ film, the drug is infused into the resulting porous polymer particles, or beads.

Experimental Details

Microdroplet Patterning

Sample preparation proceeded as follows. Multilayered porous Si films were prepared by electrochemical etch of Si wafers (p-type, B doped, <1 mΩ-cm resistivity, polished on the (100) face). The etching solution consisted of a 1:3 by volume mixture of absolute ethanol and aqueous 49% HF. Galvanostatic etching was carried out in a Teflon cell using a two-electrode configuration. The current density was modulated with a sine wave (typically between 38.5 and 192.3 $mA/cm^2$, 8 s periodicity, 70 repeats) to generate a periodically varying porosity gradient. The film was then rinsed with ethanol and dried in air. The polymer solution, polystyrene (av. M.W. 45,000) in toluene (16% by weight), was sprayed onto the porous Si film using a commercial artist's airbrush. The film was then heated at 250° C. for 30 min. To remove the porous Si film that is not masked with polymer, the sample was soaked in an aqueous basic solution (either 0.1 M NaOH for 30 min or a potassium carbonate-potassium borate-potassium hydroxide buffer at pH=10) and then rinsed with water.

Optical instrumentation and data acquisition proceeded as follows. Optical reflectivity spectra were obtained using a tungsten light source and a CCD spectrometer fitted to an optical microscope. All spectra were obtained at normal incidence, with the illumination beam coaxial with the spectrometer light path.

Scanning electron microscope (SEM) images were obtained using an FEI Quanta 600 instrument operating at an accelerating voltage of 20 kV. All samples were sputter-coated with gold.

While various embodiments of the present invention have been shown and described, it should be understood that modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for forming photonic particles, the method comprising steps of:
   preparing a porous photonic material layer;
   patterning the porous photonic material layer with a soluble polymer, leaving dividing portions of the material layer untreated;
   removing the dividing portions of the material to obtain the photonic particles.

2. The method of claim 1 wherein said step of preparing comprises preparing one of a porous Si layer, a porous $SiO_2$ layer and a porous alumina layer.

3. The method of claim 1 further comprising adhering a drug or drugs to the pores of the porous photonic material layer.

4. The method of claim 1 further comprising dissolving a drug or drugs into the soluble polymer.

5. The method of claim 1 further comprising depositing a drug or drugs following removal of the dividing portions.

6. The method of claim 1 wherein the soluble polymer comprises one of the group consisting of polystyrene, polyesters, poly (lactic acid), PLGA, collagen, zein and hydrogels.

7. The method of claim 1 further comprising removing the dividing portions with an aqueous base.

8. The method of claim 1 wherein said patterning comprises dispersing polymer beads on the surface of the material layer, the method further comprising a step of softening the polymer beads to permit them to infiltrate into the material layer.

9. The method of claim 8, wherein said dispersing comprises dispersing the polymer beads directly into contact with the surface of the material layer.

10. The method of claim 8, wherein said dispersing comprises forming a soft polymer pad on the surface of the material layer, dispersing the polymer beads onto the soft polymer pad, and exposing the beads to the surface of the material layer.

11. The method of claim 1 further comprising adding target moieties to the photonic particles for targeting of specific cells and/or tissues, the target moieties are usually added by chemical modification after the particles are formed, and the payload is usually inside the particles.

12. The method of claim 11 further comprising adding the target moieties to the particles via chemical modification of the particles following removal of the dividing portions.

13. The method of claim 11 further comprising including a payload with the particles.

14. The method of claim 12 further comprising selecting the payload from the group consisting of a drug, image contrast agent and magnetic nanoparticles.

15. The method of claim 1, wherein said patterning comprises:
    depositing the soluble polymer on the porous photonic material layer; and
    infusing the polymer into the material layer.

16. The method of claim 15 wherein said step of patterning comprises spray deposition of the soluble polymer.

17. The method of claim 15 wherein said infusing comprises baking the polymer into the material layer.

18. The method of claim 1, wherein said step of patterning comprises ink-jet printing or nozzle spraying the soluble polymer.

* * * * *